(12) United States Patent
Tsai et al.

(10) Patent No.: US 6,226,250 B1
(45) Date of Patent: May 1, 2001

(54) LOADING MECHANISM OF DISK TYPE DATA STORAGE DEVICE

(75) Inventors: Ching-hsiang Tsai, Taipei; Wei-chien Wang, Tainan, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/390,775

(22) Filed: Sep. 7, 1999

(30) Foreign Application Priority Data

Jul. 1, 1999 (TW) .................................................. 88210924

(51) Int. Cl.⁷ ............................. G11B 33/02; G11B 17/04
(52) U.S. Cl. ............................................................. 369/77.1
(58) Field of Search ................................. 369/75.1, 75.2, 369/77.1, 77.2

(56) References Cited

U.S. PATENT DOCUMENTS

| | | | |
|---|---|---|---|
| 5,497,365 | * 3/1996 | Lee ....................................... | 369/75.2 |
| 5,726,967 | * 3/1998 | Tanaka et al. ........................ | 369/192 |
| 5,768,241 | * 6/1998 | Kanazawa et al. .................. | 369/77.2 |
| 5,862,012 | * 1/1999 | Tsuchiya ............................. | 360/99.02 |

* cited by examiner

Primary Examiner—David L. Ometz
Assistant Examiner—Franklin D. Altman, III
(74) Attorney, Agent, or Firm—Bacon & Thomas, PLLC

(57) ABSTRACT

A loading mechanism of disk type data storage device for accessing data from a disk is disclosed. The mechanism comprises a main chassis having a sliding slot and a rotating shaft, a disk tray mounted to the main chassis for the loading of the disk; an optical pick-up module mounted to the main chassis for accessing data from the disk; a height controlling arm for height controlling of the optical pick-up module; a motor driving a transmission gear module; a sliding rack contained in the sliding slot of the main chassis and driven by the transmission gear module so as to drive the height controlling arm; a first detecting switch to stop the motor after the disk tray is fully loaded into the main chassis; and a second detecting switch to stop the motor when the disk tray is fully unloaded from the main chassis.

4 Claims, 9 Drawing Sheets

5

6

LOADING MECHANISM OF DISK TYPE DATA STORAGE DEVICE

BACKGROUND OF THE INVENTION a) Technical Field of the Invention

The present invention relates to a disk type data storage device and, in particular, to a loading mechanism of a disk type data storage device.

b) Description of the Prior Art

In recent years, disk type data storage devices such as optical disk drives have been widely used. loading mechanism of a disk type data storage device is a relatively important part of the device. In order to upgrade the performance of the disk type data storage device, manufacturers have been continuously upgrading the rotation speed of the spindle motor of the device to increase the speed of reading and writing data.

There are a number of types of disk loading mechanism. A conventional loading mechanism of this type is proposed in the U.S. Pat. No. 5,726,967 issued to Tanaka, et al., entitled "Disk Playback Apparatus For A Disk Player". As shown in FIG. 4 of the patent, the loading mechanism employs a cam gear having a cam groove to drive the ascending or descending of an optical pick-up module (clamping the disk or releasing the disk) and a gear to load or unload the disk tray. This type of mechanism has an unbalanced support to the optical pick-up module, and causes vibration at high rotation speed of disk. Thus, reading of data is affected. In addition, this type of cam gear design occupies a larger space which limits the accommodation space for other mechanical parts or electronic elements.

SUMMARY OF THE INVENTION

An object of the invention is to provide a loading mechanism of a disk type data storage device in which the optical pick-up module is stably supported and guided and of smaller size to allow other mechanical or electronic parts to be mounted.

An aspect of the present invention is to provide a loading mechanism of a disk type data storage device comprising a loading mechanism of disk type data storage device for accessing data from a disk, comprising a main chassis having a sliding slot and a rotating shaft; a disk tray, insertably mounted to the main chassis for the loading of the disk, including a projected sheet, an elongated cam, and a rack; an optical pick-up module, mounted to the main chassis, for data accessing from the disk; a height controlling arm to control the height of the optical pick-up module by rotating the arm; a gear transmission module to drive the retractable movement of the disk tray and to drive the height controlling arm to rotate; a motor for driving the transmission gear module; a sliding rack having a hole and being contained within the sliding slot of the main chassis and being moved by the transmission gear module so as to drive the height controlling arm; a first detecting switch to stop the motor by triggering the height controlling arm after the disk tray is fully loaded into the main chassis; and a second detecting switch to stop the motor by triggering the disk tray after the disk tray is fully unloaded from the main chassis; wherein the height controlling arm has a front, a rear and two terminal ends and includes a central hole adapted for the rotating shaft of the main chassis so that the height controlling arm rotates about the central hole with the rotating shaft; a pair of height controlling cams vertically mounted to the two terminal ends at the front of the height controlling arm, said cams having opposite inner side face and outer side face to drive the height of the optical pick-up module; a first and second lateral board being respectively and vertically mounted to the outer side face of the height controlling cam; a first pin vertically mounted to the first lateral board for driving the projected sheet of the disk tray and being drivable by the projected sheet so as to control the height of the optical pick-up module and the retractable movement of the disk tray; a second pin vertically mounted to the second lateral board and movably contained in the elongated cam to restrict the moving direction of the height controlling arm to stably support and guide the optical pick-up module; and a third pin mounted at the rear face of the height controlling arm and contained in the hole of the sliding rack to control the movement of the sliding rack.

The sliding rack and the height controlling arm are formed integrally, and if the sliding rack and the sliding slot are made into curving shapes, corresponding to each other, another embodiment of loading mechanism is obtained.

The extension section of the main chassis, corresponding to the moving direction of the sliding rack, is provided with a dent to provide withdrawal of the disk tray by pushing the front end of the sliding rack when the power supply is cut off while the disk is loaded on the tray.

DETAILED DESCRIPTION OF THE PREFERRED EMBODIMENT

Figure 1:
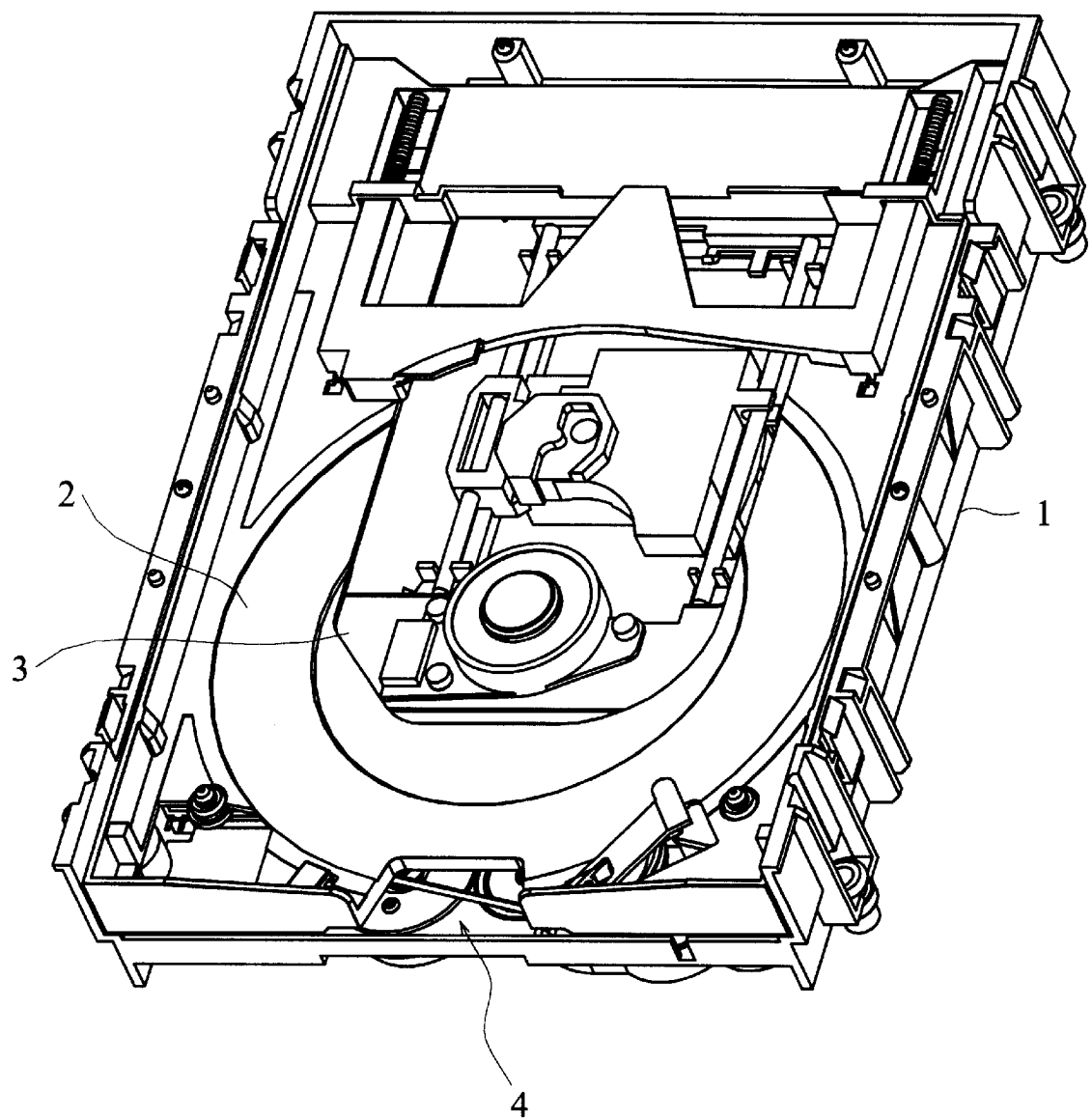
FIG. 1 is a perspective view of the loading mechanism of a disk type data storage device of the present invention.

Referring now to the drawings, particularly to FIG. 1, a preferred embodiment of a loading mechanism according to the invention will be described herein below in detail. As shown in FIG. 1, the loading mechanism comprises a main chassis 1, a disk tray 2, an optical pick-up module 3, and a transmission gear module 4.

Figure 2:
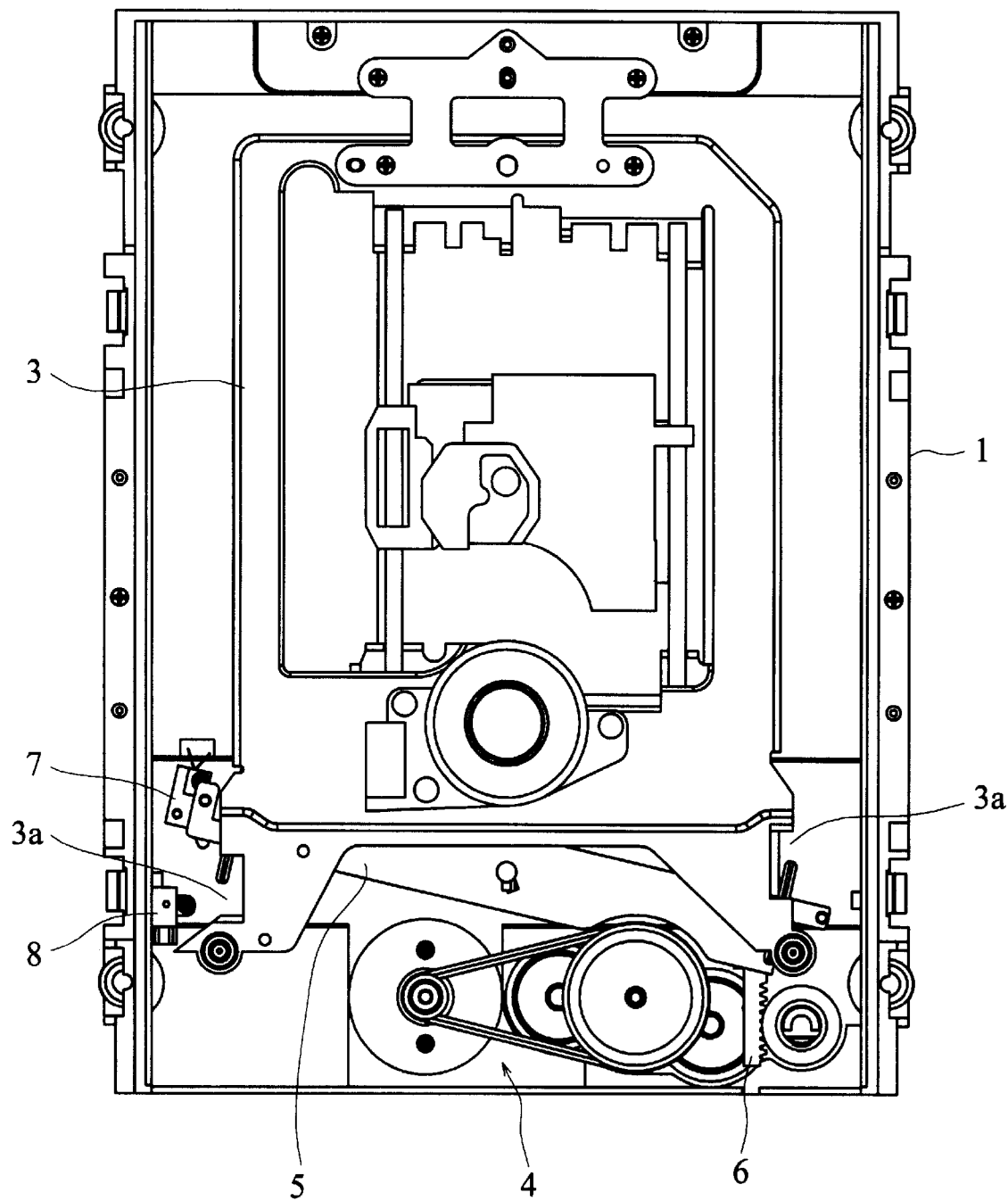
FIG. 2 is a top view of FIG. 1 with the removal of the disk tray.

FIG. 2 is a top view of the loading mechanism of FIG. 1 after the disk tray has been removed. As shown in FIG. 2, the loading mechanism comprises a height controlling arm 5, a sliding rack 6, a first detecting switch 7 and a second detecting switch 8. In accordance with the preferred embodiment of the present invention, there are two dents 3a formed on the optical pick-up module 3. The function of the dents 3a shall be described hereinafter.

Figure 3:
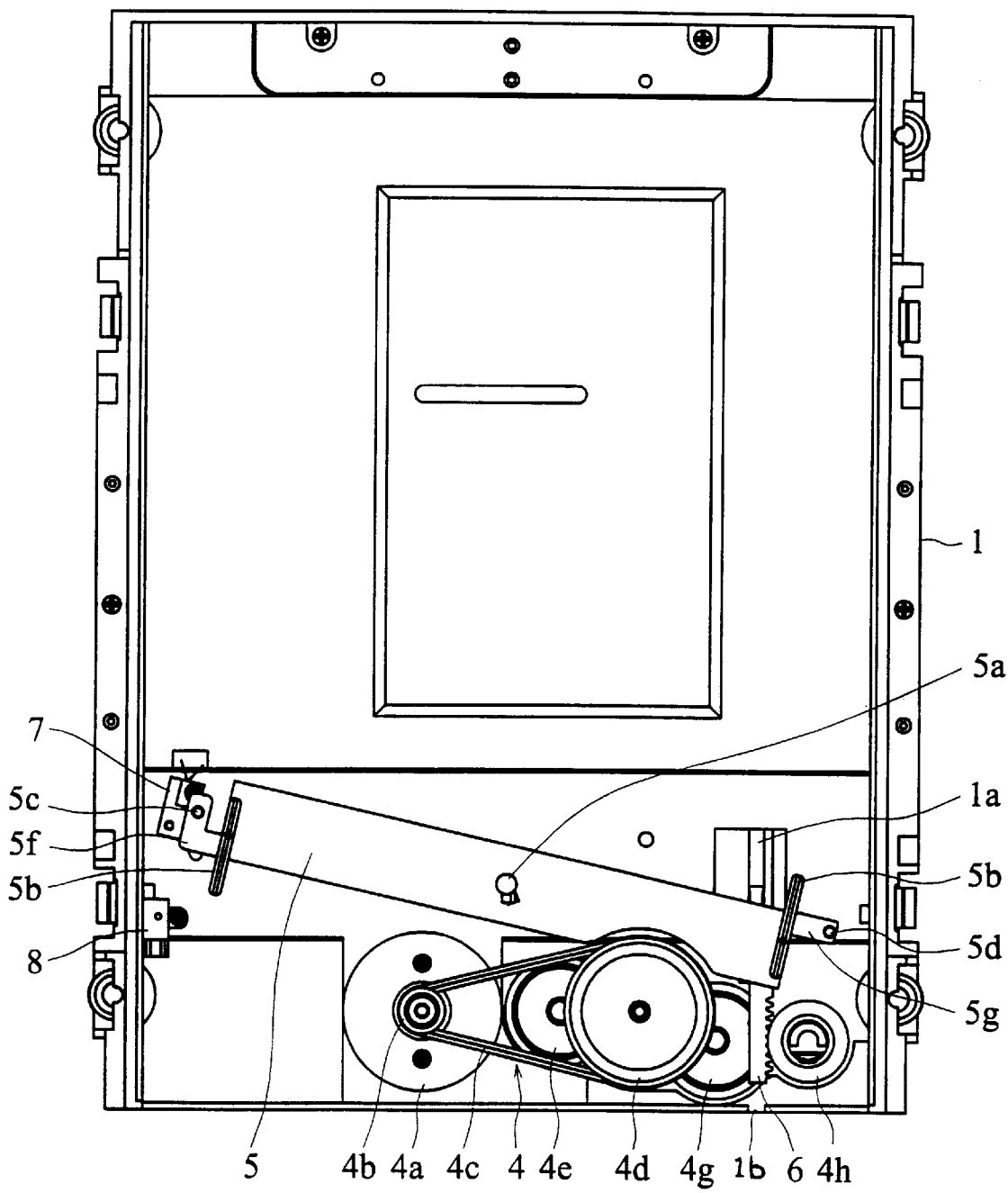
FIG. 3 is a top view of FIG. 2 with the removal of the optical pick-up module.

FIG. 3 is a top view of the loading mechanism of FIG. 2 after the optical pick-up module 3 has been removed. FIG.

Figure 4:
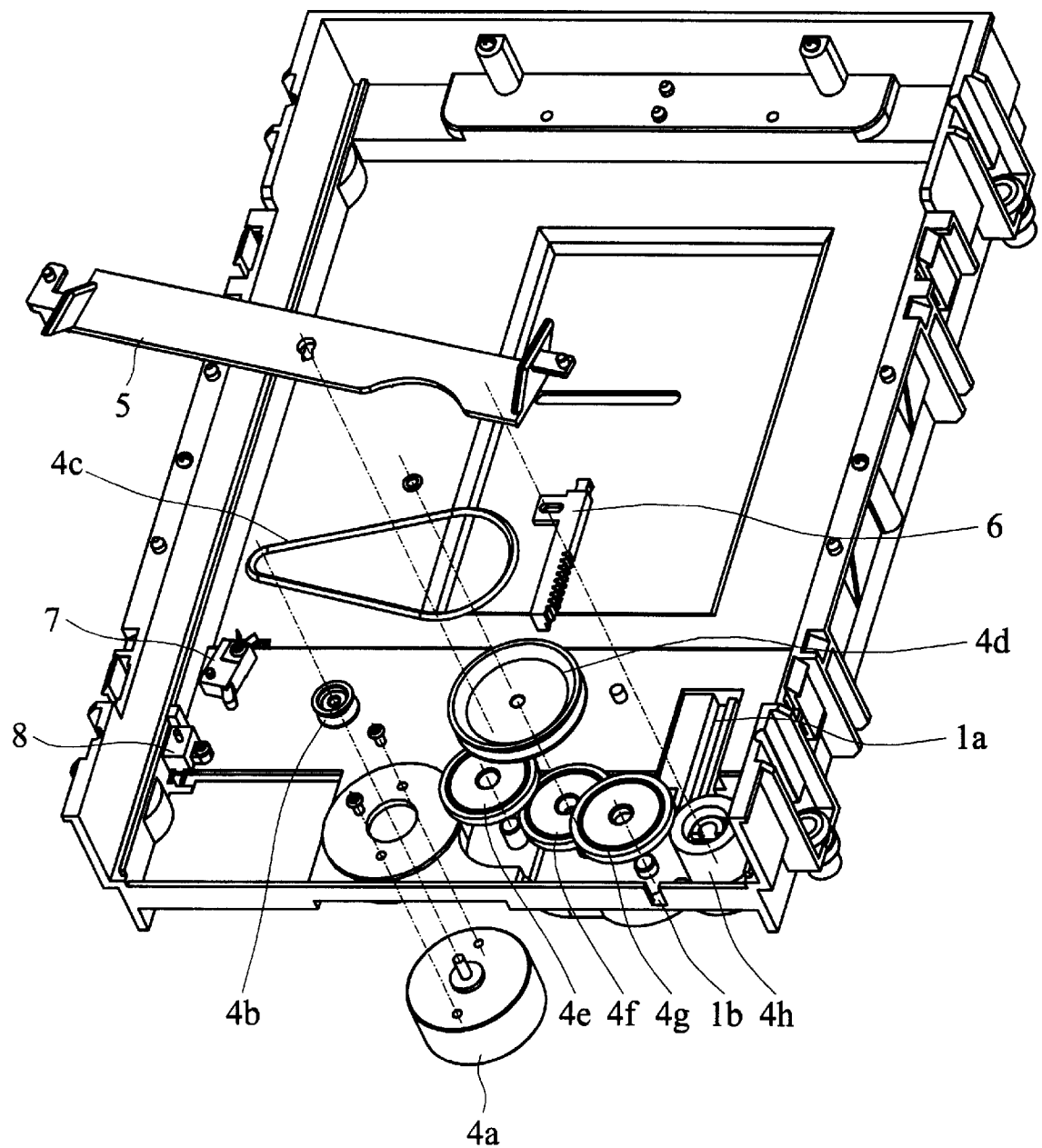
FIG. 4 is an exploded view of FIG. 3.

4 is an exploded view of the loading mechanism of FIG. 3. Referring to FIG. 4, the transmission gear module includes a motor 4a, a small pulley 4b, a belt 4c, a large pulley 4d, and a plurality of tooth wheels 4e–4h. The main chassis 1 is provided with a rotating shaft (not shown) and a sliding slot 1a and an opening 1b.

Figure 5:
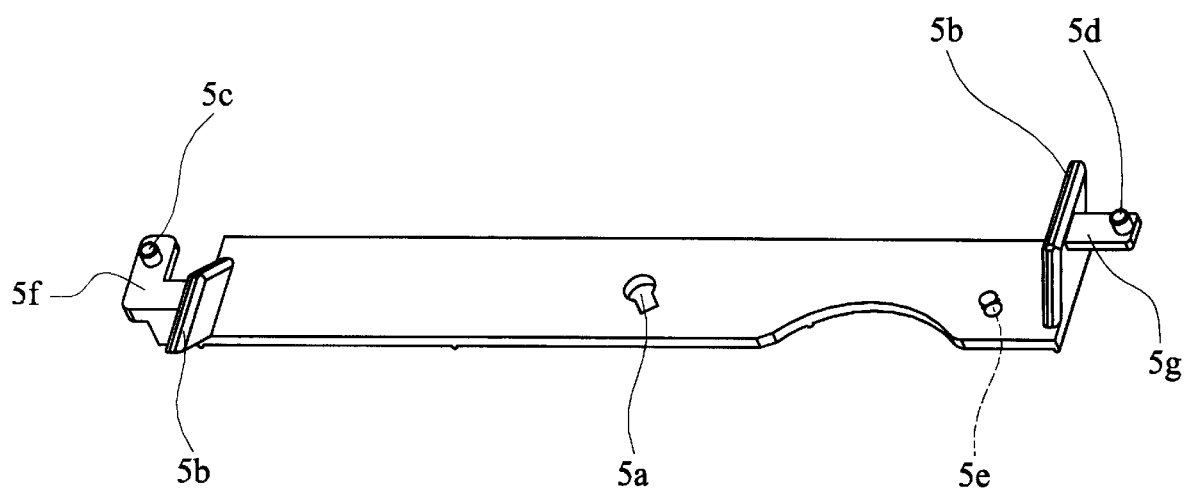
FIG. 5 is a perspective view of the height controlling arm of the present invention.
Figure 6:
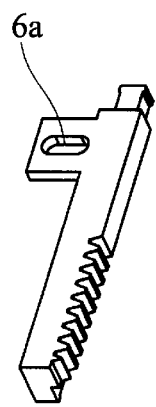
FIG. 6 is a perspective view of the sliding rack of the present invention.
Figure 7:
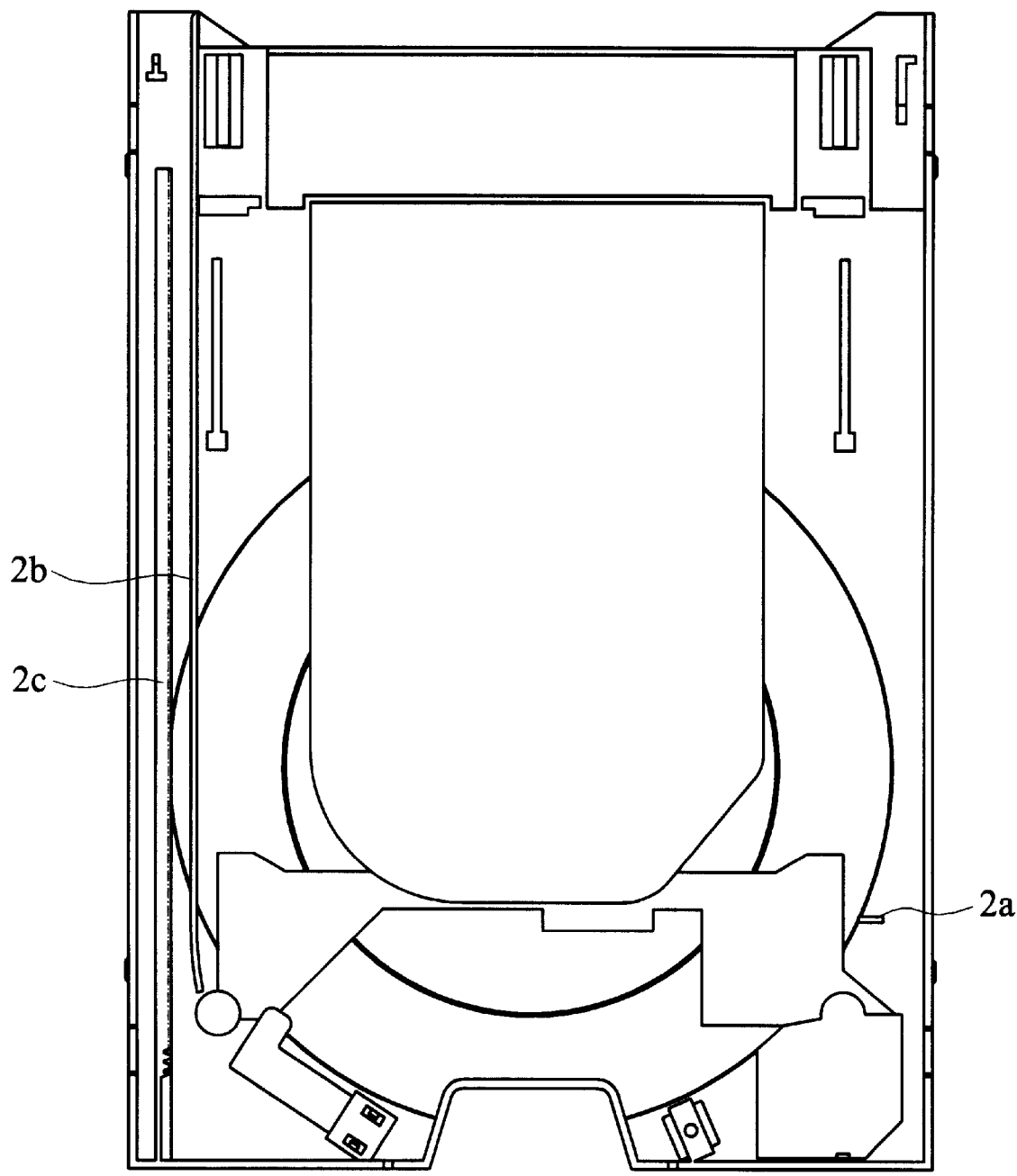
FIG. 7 is a bottom view of the disk tray.

FIG. 5 is a perspective view of the height controlling arm. FIG. 6 is aperspective view of the sliding rack 6. FIG. 7 is a bottom view of the disk tray 2. Referring to FIG. 6, an elliptical hole 6a is formed on the sliding rack 6. Referring to FIGS. 4 and 5, the height controlling arm 5 includes a central hole 5a to accommodate the rotating shaft (not shown) of the main chassis 1 so that the height controlling arm 5 rotates with the rotating shaft as the centre; a pair of height controlling cams 5b substantially vertically mounted to the two terminal ends of the front of the height controlling arm 5 to drive the height of the optical pick-up module 3 (FIG. 1); a first 5f and second lateral board 5g being respectively and vertically mounted to the outer side face of the height controlling cam 5b; a first pin 5c vertically mounted to the first lateral board 5f for driving the projected sheet 2a of the disk tray 2 and being drivable by the projected sheet 2a so as to control the height of the optical pick-up module 3 and the retractable movement of the disk tray 2; a second pin 5d vertically mounted to the second lateral board 5g and movably contained in the elongated cam 2b to restrict the moving direction of the height controlling arm 5 to stably support and guide the optical pick-up module 3; and a third pin 5e mounted at the rear of the height controlling arm 5 and contained in the elliptical hole 6a of the sliding rack 6 to control the movement of the sliding rack 6.

The function of the above elements and their relationship are described herein below:

Referring to FIG. 1, the main chassis 1 is used to hold the disk tray 2, the optical pick-up module 3, and the transmission gear module 4. Referring to FIG. 2, the optical pick-up module 3 is used to read the data of the disk or to write data on the disk.

Referring to FIG. 3, when the disk is loaded and positioned, the height controlling arm 5 triggers the first detecting switch 7 to stop the motor 4a from operation. When the disk tray 2 is retracted and positioned, the second detecting switch 8, triggering by the disk tray 2, causes the motor 4a to stop operation.

In addition, the sliding rack 6 is slidably mounted to the sliding slot 1a of the main chassis 1. The tooth wheel 4h of the transmission gear module 4 is an output tooth wheel to drive the sliding rack 6 to slide on the sliding slot 1a. The third pin 5e is in combination with the elliptical hole 6a. Thus, when the sliding rack 6 slides, the height controlling arm 5 rotates slightly by means of the elliptical hole 6a and the third pin 5e.

The central hole 5a of the height controlling arm 5 works in combination with the rotating shaft (not shown), such that the height controlling arm S rotates slightly about the rotating shaft. When the height controlling arm 5 rotates, the height controlling cams 5b can contact with the dent 3a (referring to FIG. 2) of the optical pick-up module 3 and in turn the height of the optical pick-up module 3 is changed.

Referring to FIGS. 3 and 7, the first pin 5c can contact with the projected sheet 2a to push the projected sheet 2a and can be pushed by the projected sheet 2a. The second pin 5d closely slides on the elongated cam 2b to stably support and guide the optical pick-up module 3. Another function of the tooth wheel 4h is used to drive the rack 2c at the back of the disk tray 2 so as to load or unload the disk tray 2.

Figure 8:
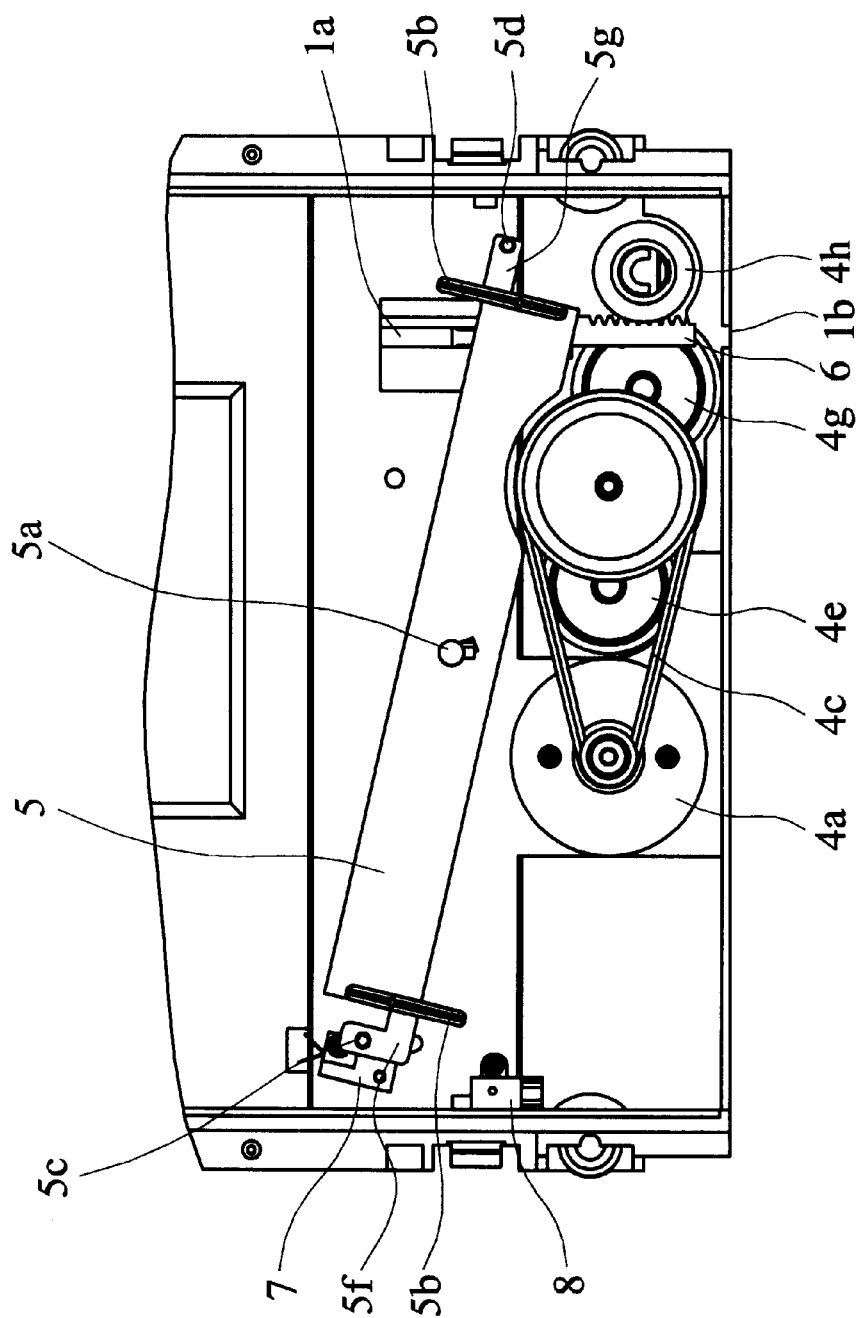
FIG. 8 is a partial top view of the loading mechanism with a loaded disk.

FIG. 8 is a partial top view of the loading mechanism with a disk loaded. The optical pick-up module 3 has not been shown in FIG. 8. FIG. 8 illustrates the position of the height controlling arm 5 and the sliding rack 6. At this instance, the height controlling arm 5 rotates to an angle with respect to the horizontal position, and the height controlling cam 5b can lift up the optical pick-up module 3, and the tooth wheel 4h engages with the sliding rack 6 to drive the sliding rack 6. Thus, the first detecting switch 7 is also triggered by the height controlling arm 5.

Figure 9:
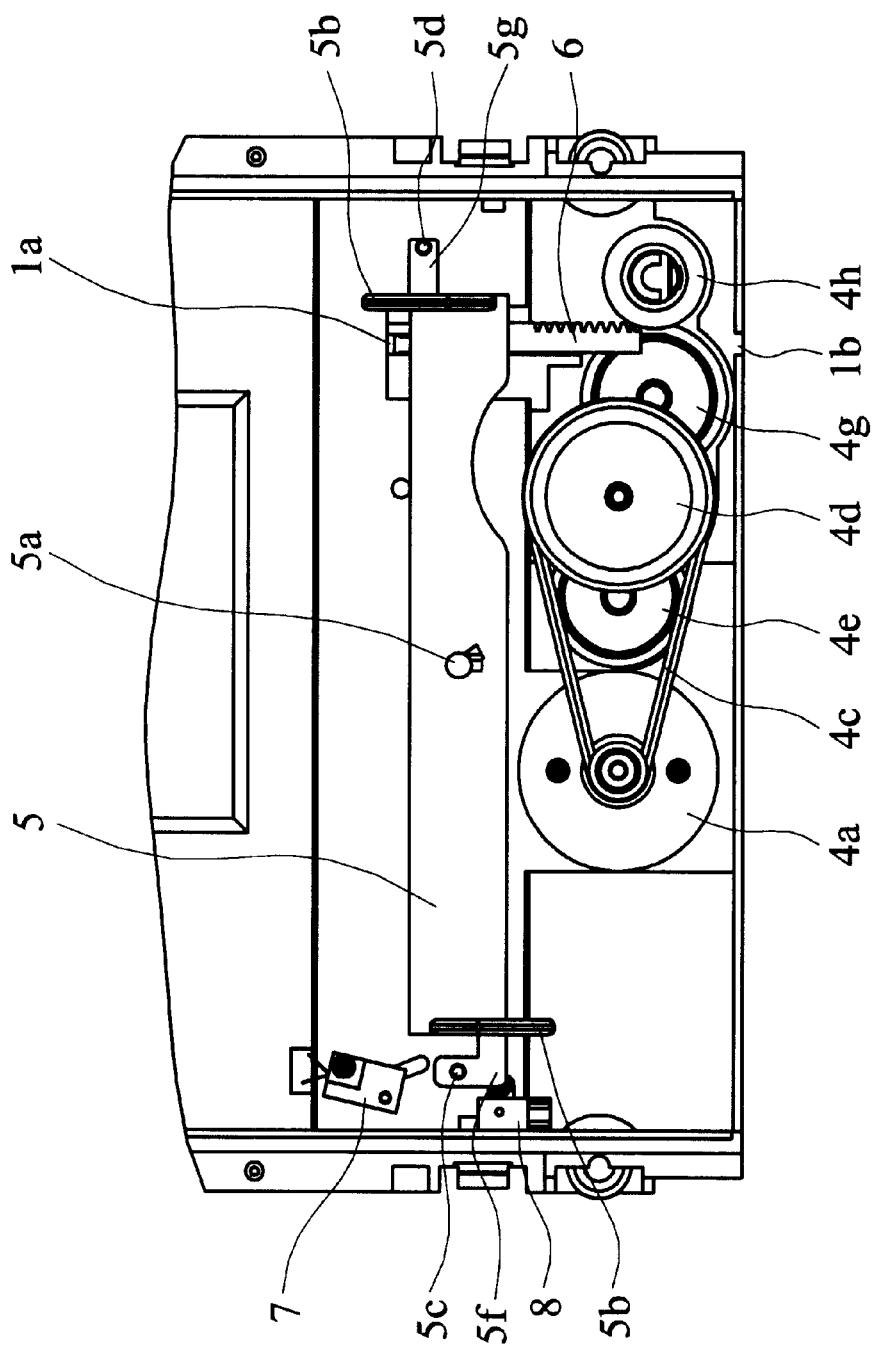
FIG. 9 is a partial top view of the loading mechanism at unloading status.
Figure 10:
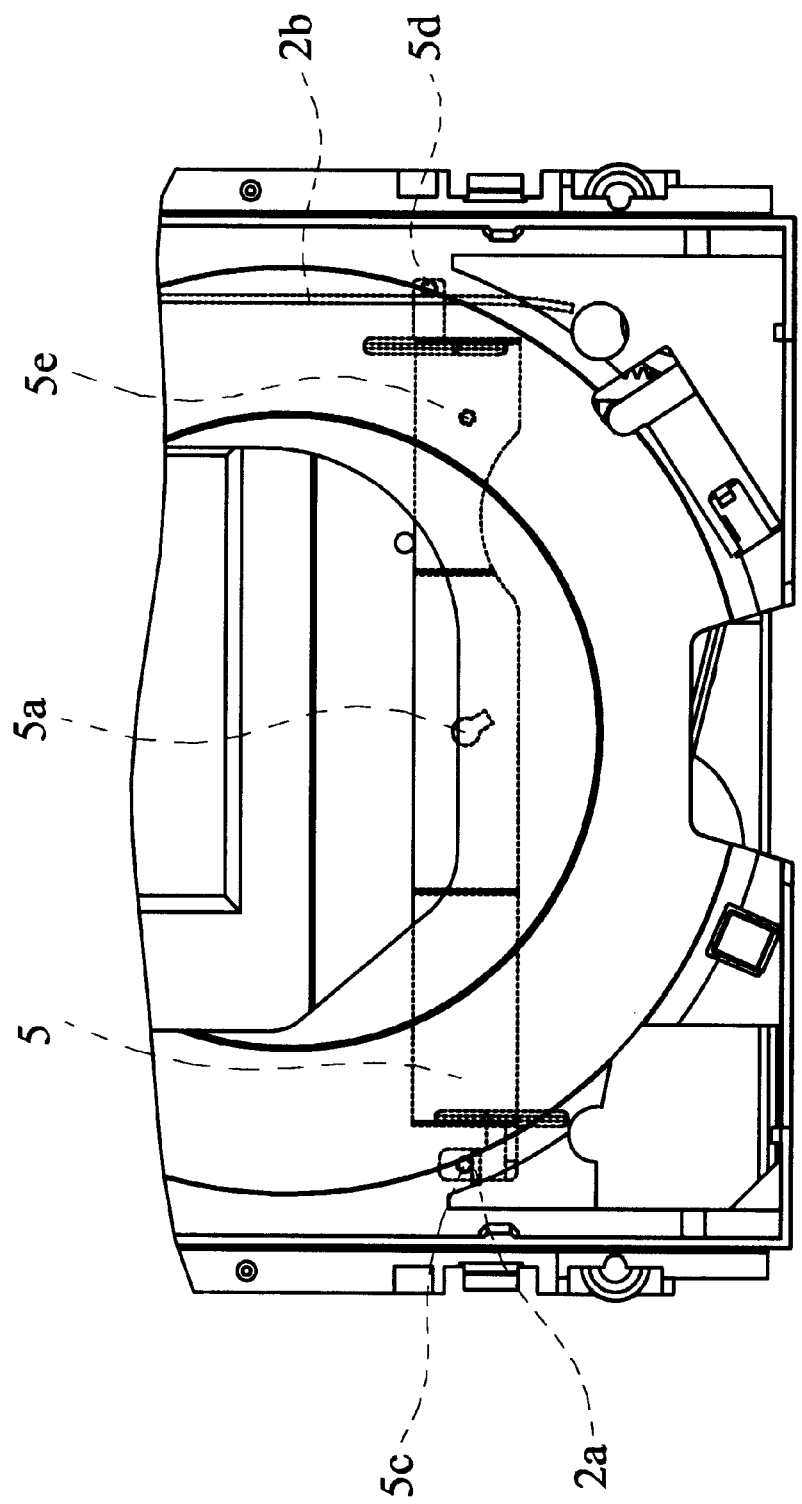
FIG. 10 is a view showing the relationship of the disk tray and the height controlling arm.

FIG. 9 is a partial top view of the optical loading mechanism with no disk loaded. FIG. 10 illustrates the mutual relationship of the disk tray 2 and the height controlling arm 5. As shown in FIG. 9, the height controlling arm 5 rotates to the horizontal, and the sliding rack disengages from the tooth wheel 4h. The height controlling arm 5 has totally slided to the dent 3a (referring to FIG. 2) corresponding to the optical pick-up module 3 so that the optical pick-up module 3 is lowered, and the disk tray 2 is retracted by means of the tooth wheel 4h and the rack 2c.

The continuous operation of the loading mechanism is described herein below. The words, "rear", and "front" directions used in the description correspond to the "up" and "down" direction of the drawings.

(1) Disk Loading

As shown in FIG. 9, firstly, the disk tray 2 is retracted to the outermost. At this instance, the height controlling arm is at horizontal. The optical pick-up module 3 is also lowered; the disk tray 2 triggers the second detecting switch 8 to stop the operation of the motor 4a.

Next, the user places the disk or a cartridge containing disk onto the disk tray 2 and presses the disk on button (not shown), or slightly push the disk tray 2. Then, the motor 4a starts to operate and the disk tray 2 (FIG. 7) is loaded by means of the tooth wheel 4h. When the disk tray 2 is almost at position, as shown in FIGS. 9 and 10, the projected sheet 2a of the back of the disk tray 2 urges the first pin 5c of the height controlling arm 5 which causes the height controlling arm 5 to rotate clockwise for an angle. Simultaneously, the height controlling arm 5 drives the sliding rack 6 to move forward a distance such that the sliding rack 6 is in engagement with the tooth wheel 4h. As a result of the driving of the tooth wheel 4h, the height controlling arm 5 rotates clockwise, which uplifts the optical pick-up module 3. At this instance, the rack 2c at the back of the disk tray 2 is disengaged with the tooth wheel 4h and positioned. The height controlling arm 5 rotates continuously so as to uplift the optical pick-up module 3 until the first detecting switch 7 is triggered, as shown in FIG. 8.

(2) Disk Unloading

As shown in FIG. 8, when the user presses the disk eject button (not shown), the motor 4a starts to operate and the tooth wheel 4h drives the sliding rack 6 via the transmission gear module 4 so as to drive the height controlling arm 5 to rotate counterclockwise.

At this instance, the optical pick-up module 3 is lowered and unclamps the disk. As shown in FIG. 10, when the height controlling arm 5 is rotated almost to the horizontal, the first pin 5 drives the projected sheet 2a and the back of the disk tray 2 such that the disk tray is pushed forward for a distance. At this instance, the rack 2c engages with the tooth wheel 4h and the disk tray 2 is unloaded. Next, the sliding rack 6 disengages with the tooth wheel 4h which causes the height controlling arm 5 to stop rotating, and at this instance, the optical pick-up module 3 is lowered to the lowermost. Next, the disk tray 2 continuously retracts until it triggers the second detecting switch 8.

During the loading and unloading of disk tray 2, the third pin 5e is closely adhered to one side of the elongated cam 2b. Thus, it can stably support and guide the height controlling arm 5 to avoid the height controlling arm 5 to rotate or other unstable movement in the process of disk loading and unloading.

(3) Urgent Ejection

As shown in FIG. 8, when the power supply is cut off and the disk is loaded, in order to remove the disk, an elongated object is inserted into the opening 1b at the main chassis 1 so as to push the front end of the sliding rack 6 such that the height controlling arm 5 rotates counterclockwise until the optical pick-up module 3 is lowered. Next, the disk tray 2 is pulled out manually.

While the present invention has been disclosed in terms of the preferred embodiment in order to facilitate better understanding thereof, it should be appreciated that the invention can be embodied in various ways without departing from the principle of the invention.

For instance, in the preferred embodiment, the tooth wheel used in driving the sliding rack 6 and the rack 2c of the disk tray 2 is a similar tooth wheel 4h. However, in consideration of speed of transmission, and torque, different tooth wheel may be employed. In addition, the sliding rack 6 and the height controlling arm 5 are disengagible from each other. If the sliding rack 6 and the sliding slot 1a accommodating the sliding rack 6 are in a curving shape, and the sliding rack 6 and the height controlling arm are integrally formed as a unit, similar effect can be obtained. Therefore, the invention should be understood to include all possible embodiments and modification to the shown embodiment which can be embodied without departing from the principle of the invention a set forth in the appended claims.

What is claimed is:

1. A loading mechanism of disk type data storage device for accessing data from a disk, comprising:
    a main chassis having a sliding slot and a rotating shaft;
    a disk tray, insertably mounted to the main chassis for the loading of the disk, including a projected sheet, an elongated cam, and a rack;
    an optical pick-up module, mounted to the main chassis, for data-saving and data-accessing from the disk;
    a height controlling arm to control the height of the optical pick-up module by;
    a gear transmission module to drive the retractable movement of the disk tray and to drive the height controlling arm to rotate;
    a motor for driving the transmission gear module;
    a sliding rack having a hole and being contained within the sliding slot of the main chassis and being moved by the transmission gear module so as to drive the height controlling arm;
    a first detecting switch to stop the motor by triggering the height controlling arm after the disk tray is fully loaded into the main chassis; and
    a second detecting switch to stop the motor by triggering the disk tray after the disk tray is fully unloaded from the main chassis; wherein the height controlling arm has a front, a rear and two terminal ends and includes:
        a central hole adapted for the rotating shaft of the main chassis so that the height controlling arm rotates about the central hole with the rotating shaft;
        a pair of height controlling cams vertically mounted to the two terminal ends at the front of the height controlling arm, said cams having opposite inner side face and outer side face to drive the height of the optical pick-up module;
        a first and second lateral board being respectively and vertically mounted to the outer side face of the height controlling cam;
        a first pin vertically mounted to the first lateral board for driving the projected sheet of the disk tray and being drivable by the projected sheet so as to control the height of the optical pick-up module and the retractable movement of the disk tray;
        a second pin vertically mounted to the second lateral board and movably contained in the elongated cam to restrict the moving direction of the height controlling arm to stably support and guide the optical pick-up module; and
        a third pin mounted at the rear of the height controlling arm and contained in the hole of the sliding rack to control the movement of the sliding rack.

2. A loading mechanism of disk type data storage device for accessing data from a disk, comprising:
    a main chassis having a sliding slot and a rotating shaft;
    a disk tray, insertably mounted to the main chassis for the loading of the disk, including a projected sheet, an elongated cam, and a rack;
    an optical pick-up module, mounted to the main chassis, for accessing data from the disk;
    a height controlling arm to control the height of the optical pick-up module by;
    a gear transmission module to drive the retractable movement of the disk tray and to drive the height controlling arm to rotate;
    a motor for driving the transmission gear module;
    a first detecting switch to stop the motor by triggering the height controlling arm after the disk tray is fully loaded into the main chassis;
    a second detecting switch to stop the motor by triggering the disk tray after the disk tray is fully unloaded from the main chassis; wherein the height controlling arm has a front, a rear and two terminal ends and includes:
        a central hole adapted for the rotating shaft of the main chassis so that the height controlling arm rotates about the central hole with the rotating shaft;
        a pair of height controlling cams vertically mounted to the two terminal ends at the front of the height controlling arm, said cams having opposite inner side face and outer side face to drive the height of the optical pick-up module;
        a first and second lateral board being respectively and vertically mounted to the outer side face of the height controlling cam;
        a first pin vertically mounted to the first lateral board for driving the projected sheet of the disk tray and being drivable by the projected sheet so as to control the height of the optical pick-up module and the retractable movement of the disk tray;
        a second pin vertically mounted to the second lateral board and movably contained in the elongated cam to restrict the moving direction of the height controlling arm to stably support and guide the optical pick-up module; and
        a sliding rack mounted at the rear face of the height controlling arm and contained within the sliding slot of the main chassis and driven by the transmission gear module so as to drive the height controlling arm.

3. The loading mechanism of disk type data storage device as set forth in claim 1, wherein a dent is provided to the main chassis, corresponding to an extension section of the moving direction of the sliding rack to enable withdrawal of the disk tray when the power supply is cut off while the disk is loaded on the disk tray.

4. The loading mechanism of disk type data storage device as set forth in claim 2, wherein a dent is provided to the main chassis, corresponding to an extension section of the moving direction of the sliding rack to enable withdrawal of the disk tray when the power supply is cut off while the disk is loaded on the disk tray.

* * * * *